United States Patent [19]
Soda et al.

[11] Patent Number: 5,486,125
[45] Date of Patent: Jan. 23, 1996

[54] DRIVE TRANSMISSION SYSTEM FOR VESSEL PROPELLING EQUIPMENT

[75] Inventors: Chiharu Soda; Yasushi Fujita; Yoshihiko Fukuda; Kaoru Ichihashi, all of Wako, Japan

[73] Assignee: Honda Giken Kogyo Kabushiki Kaisha, Tokyo, Japan

[21] Appl. No.: 247,980

[22] Filed: May 23, 1994

[30] Foreign Application Priority Data

| May 25, 1993 | [JP] | Japan | 5-144430 |
| Jun. 3, 1993 | [JP] | Japan | 5-034884 U |
| Jun. 3, 1993 | [JP] | Japan | 5-034885 U |
| Jun. 3, 1993 | [JP] | Japan | 5-156332 |

[51] Int. Cl.⁶ .................................................. B63H 20/20
[52] U.S. Cl. ............................. 440/75; 74/378; 192/51; 440/2; 440/83
[58] Field of Search ............................ 440/2, 75, 78, 440/83, 84, 86; 192/21, 51; 74/378

[56] References Cited

U.S. PATENT DOCUMENTS

| 2,718,792 | 9/1955 | Kiekhaefer | 440/75 X |
| 4,530,667 | 7/1985 | McCormick | 440/75 |
| 4,986,775 | 1/1991 | Wantz | 440/83 |
| 4,990,112 | 2/1991 | Imaeda | 440/75 |
| 5,051,102 | 9/1991 | Onoue | 74/378 X |
| 5,059,144 | 10/1991 | Onoue | 440/75 |
| 5,076,113 | 12/1991 | Hayasaka | 440/86 X |

FOREIGN PATENT DOCUMENTS

| 50-21493 | 3/1975 | Japan . |
| 57-160796 | 10/1982 | Japan . |

*Primary Examiner*—Sherman Basinger
*Attorney, Agent, or Firm*—Armstrong, Westerman, Hattori, McLeland & Naughton

[57] ABSTRACT

A drive transmission system for a vessel propelling equipment 1 provided with a clutch operating device that can easily be installed comprises a shift slider 40 axially slidable within a propeller shaft 9 to move a clutch gear 30 through a clutch shifter pin 38 inserted through the propeller shaft; and an operating member capable of operating the shifts slider from above a gear case 5; the operating member includes: a shift fork 50 engaged with 9 fork engaging portion 35c of the shift slider, to move the shift slider; a guide member 59 supporting the shift fork movable in a specific direction; a rotary rod member 55 engaged with a rod engaging section 50b of the shift fork to move the shift fork; and a support member 51 drivably supporting the rod member and fixedly supporting the guide member, thereby sub-assembling the rod member and the guide member to transmit the operation of the rod member to the shift fork; the shift fork is so assembled to be engaged with the fork engaging section of the shift slider by fitting the support member from above in a specific fitting section in the gear case, thereby transmitting the movement of the rod member to the shift slider.

9 Claims, 11 Drawing Sheets

DRIVE TRANSMISSION SYSTEM FOR VESSEL PROPELLING EQUIPMENT

BACKGROUND OF THE INVENTION

1. Field of the Invention

The present invention relates to a drive transmission system for a vessel propelling equipment such as an outboard motor, aboard-outboard motor and so forth in which power is transmitted through a clutch.

2. Description of the Related Art

In most of vessel propelling equipment, output power of an engine is transmitted downward by means of a vertical shaft to a propeller shaft. There is provided a clutch mechanism between the vertical shaft and the propeller shaft. The clutch mechanism is composed of two bevel gears rotatably supported or the propeller shaft and driven by the vertical shaft to rotate in opposite directions to each other, and a clutch gear rotatable together with the propeller shaft and slidable along the propeller shaft. The clutch gear is engaged with either bevel gear according to its sliding direction to rotate the propeller shaft in a normal direction or a reverse direction.

In a vessel propelling equipment disclosed in Japanese Patent Laid-Open No. Sho 50-21493, the above-mentioned clutch gear is connected to an annular member axially slidably fitted around the propeller shaft by means of a slider so that the, clutch gear can be slided by sliding the annular member. The annular member is provided with a groove on the periphery and an engaging pin eccentrically hanging down from a lower end of a vertical manipulating shaft (shift rod) is engaged with the groove.

With the rotation of the shift rod the engaging pin rocks back and forth to move the annular member back and forth, thus operating the clutch.

Since the annular member, however, rotates normally and reversely at a high speed together with the propeller shaft, with the engaging pin in the lower part of the shift rod engaging and sliding in contact with the groove in the outer periphery of the annular member, and the annular member is pressed back and forth by the engaging pin while rotating at a high speed, deviation of the shaft center and vibration of the shaft, if slight, are likely to exercise influence on the operation. It is, therefore, necessary to be greatly careful in manufacturing and mounting a support structure of an operation system in order to insure reliable operation of the drive transmission system.

Japanese Patent Laid-Open No. Sho 57-160796 discloses anothe outboard motor. FIG. 16 shows the lowermost part of the outboard motor. On a propeller shaft 01 having a propeller (not shown) fitted at the rear end are rotatably supported a front driven gear 03 and a rear driven gear 04. These driven gears 03, 04 are bevel gears meshed with a drive gear (not shown) fitted to a lower end of a vertical shaft which is an output shaft of an engine (not shown). Rotation of the vertical shaft is transmitted to the driven gears 03, 04, and the driven gears 03, 04 rotate in opposite direction to each other.

A clutch gear 06 is fitted on the propeller shaft by splines between the driven gears 03, 04. In FIG. 16, the clutch gear is positioned at its neutral position. When the clutch gear 06 slides forward and meshes with clutch teeth of the driven gear 03, rotation in the normal direction of the driven gear 03 is transmitted to the propeller shaft 01 and a forward thrust is generated by the propeller. On the other hand, when the clutch gear 06 slides rearward to mesh with clutch teeth of the driven gear 04, rotation in the revese direction of the driven gear 04 is transmitted to the propeller shaft 01 to generate a rearward thrust.

Sliding of the clutch gear 06 is caused by a manipulating shaft 07. The manipulating shaft 07 is connected to the clutch gear 06 by means of a cam 08 fitted to the lower end of the manipulating shaft 07, a cam follower 09 engaging with the cam 08 to move back and forth, a shift slider 010 connected to the cam follower 09 and inserted within the propeller shaft axially slidably, and a clutch shifter pin 011 passing through elongate holes of the shift slider 010 and the propeller shaft 01 perpendicularly and fitted to the clutch gear 06, in turn.

The shift slider 010 is formed in a cylindrical shape, within which to springs 012, 013 are inserted putting the clutch shifter pin 011 between them. The clutch gear 06 is positioned at the neutral position by a set pin provided on the spline fitting position between the clutch gear 06 and the propeller shaft When the manipulating shaft 07 is manipulated to rotate the cam 08 and wove the shift slider 010 together with the cam follower 09 forward, for example, in the beginning the clutch gear 06 and the clutch shifter pin 011 are held to the neutral position by the set pin and the rear spring 013 is compressed.

Then, at the time when the force of the spring 013 exceeds the holding force by the set pin, the set pin releases the clutch shifter pin 011 and the force of the spring 013 acts on the clutch gear 06 through the clutch shifter pin 011 to cause a snap action, what is called detent action, of the clutch ear 06 forwardly. The clutch teeth of the clutch gear 06 meshes with the clutch teeth of the front driven gear 03 smoothly, the propeller shaft 01 and the propeller integrally fitted to the shaft 01 rotate in the normal direction and tile vessel goes ahead.

On the other hand, when the shift slider 010 moves rearward, the front spring 012 is compressed and the clutch gear 06 meshes with the rear driven gear 04 by the detent action to rotate the propeller shaft 01 and the propeller in the reverse direction so that the vessel goes astern.

Though a smooth clutch engagement can be achieved by the detent action as described above, the above customary detent construction requires two springs 012, 013, and a special jig is necessary when the clutch shifter is assembled, in order to hold the springs 012, 013 in compressed conditions for example, therefore the assembling is not easy.

SUMMARY OF THE INVENTION

In view of the above-described disadvantages, the present invention has been accomplished and has as an object the provision of a drive transmission system of a vessel propelling equipment which has solved these disadvantages, facilitating reliable support and accurate installation of the operation system.

In order to attain the above-described object, the present invention provides a drive transmission system for a vessel propelling equipment in which a propeller shaft having a propeller on one end is rotatably supported inside of a gear case, a pair of gears including an ahead gear and an astern gear which rotate in opposite directions are rotatably supported on the propeller shaft, a clutch gear rotating together with the propeller shaft and supported slidably forwardly and backwardly clutches either one of the above-described pair of gears, to thereby turn the propeller normally and reversely to propel a vessel ahead and astern. The drive transmission system has a shift slider which is axially slidable within the propeller shaft and moves the clutch gear through a clutch shifter pin mounted through the propeller shaft, and an operating member which can operate the shift slider from above the gear case. The operating member comprises a shift fork engaged with a fork engaging portion of the shift slider for moving the shift slider, a guide member supporting the shift fork movably in a specific direction, a rotary rod member engaged with a rod engaging portion of the shift fork to thereby move the shift fork, and a support member drivably supporting the rod member and also fixedly supporting the guide member to thereby sub-assembling the rod member and the guide member so as to transmit the operation of the rod member to the shift fork, and is assembled by fitting the support member from above in a specific fitting part of the gear case, thereby the shift fork engages with lie fork engaging portion of the shift slider and the drive power is transmitted from the rod member to the shift slider.

The shift fork, the guide member and the rotary rod member which are sub-assembled by the support member can be installed to the causing as one unit, and therefore drive transmission to the shift fork from the rod member and operation of each member can be performed exactly and efficiently. Furthermore, since the shift fork is engaged with the fork engaging portion of the shift slider by only fitting the support member from above to the specific fitting section of the gear case, a simple and sure assembling work can be realized.

The provision of the support member with a positioning means for holding the shift fork in a neutral position insures easy engagement of the shift fork with the fork engaging portion of the shift slider when the support member is to be fitted in the fitting section of the gear case.

The support member can easily be positioned relatively to the gear case by forming a slot in the fitting section of the gear case and fitting a projection provided on the support member in the slots.

Furthermore, requirements for both the base and the counter specifications can easily be covered by providing a rod engaging portion of the shift fork which is capable of engaging with the rod member also in the state that the rod member is turned to the opposite side.

DESCRIPTION OF THE PREFERRED EMBODIMENT

Hereinafter one embodiment of a drive transmission system of a vessel propelling equipment according to the present invention shown in FIGS. 1 to 12 will be explained.

Figure 1:
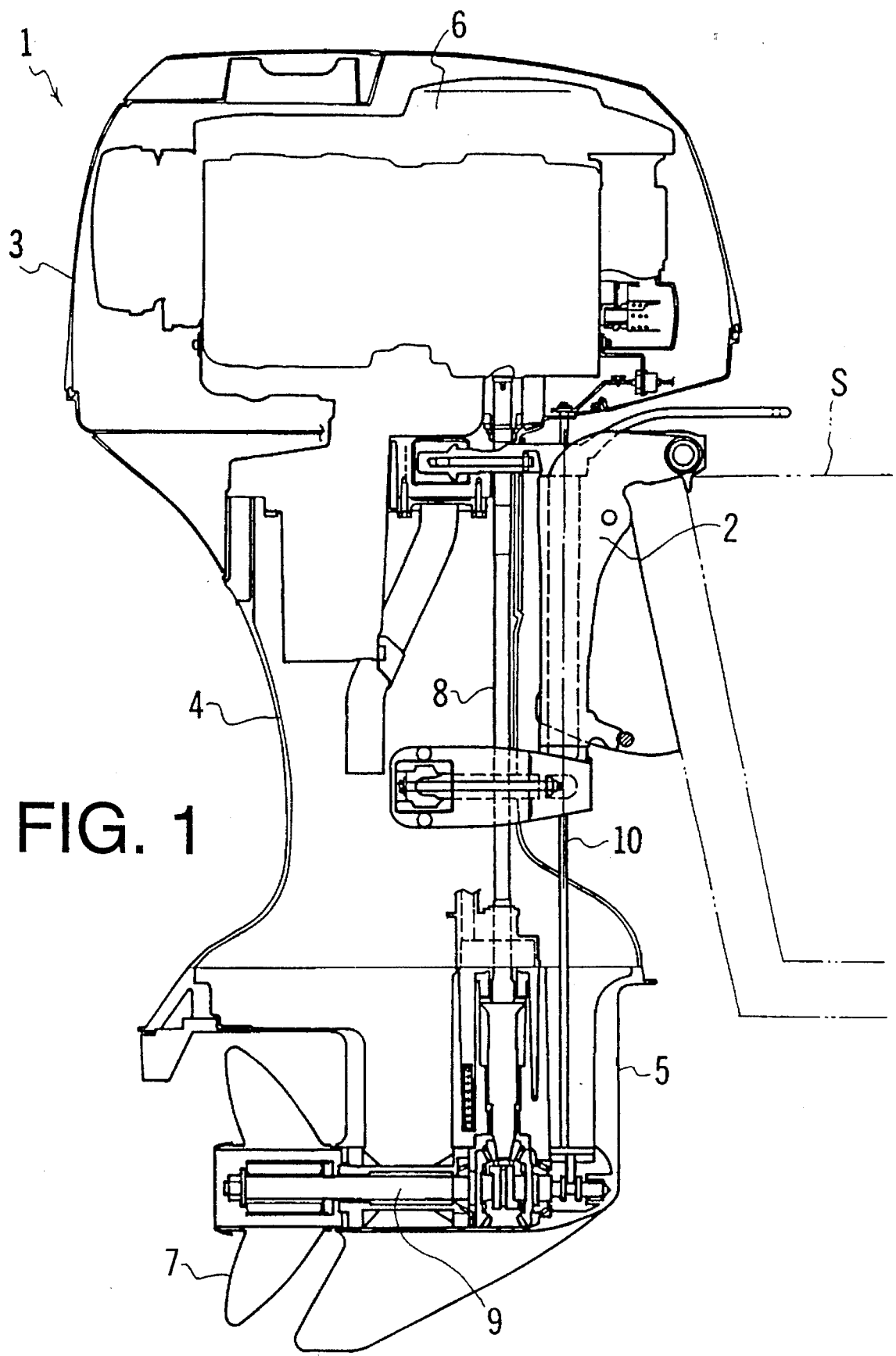
FIG. 1 is a side sectional view showing the general construction of an outboard motor of one embodiment according to the present invention.

FIG. 1 shows the general construction of an outboard motor 1 of the present embodiment.

The external shape of the outboard motor 1 mounted by a clamping device 2 at the stern of a boat S is formed of an engine cover 3 which defines a part of an engine compartment housing an engine 6, a case section 4 contracted at the middle portion and extending downwardly from the engine cover 3, and a gear case 5 supporting a propeller shaft 9 having a propeller 7 and extending horizontally.

The engine 6 in the engine cover 3 has a crankshaft extending vertically downwardly and coaxially connected to a vertical shaft 8.

The vertical shaft 8 mounted passing downwardly through the case section 4 transmits the engine power to a gear mechanism within the gear case 5, to normally and reversely rotate the propeller shaft 9 set in a substantially horizontal direction within the lower casing 5 through the gear mechanism, thereby turning the propeller 7 installed on the propeller shaft 9 to move the boat S ahead or astern.

The gear mechanism includes a clutch mechanism. A shift rod 10 for operating the clutch mechanism is mounted in parallel with the vertical shaft 8, extending from the engine cover 3 to the gear case 5.

Figure 2:
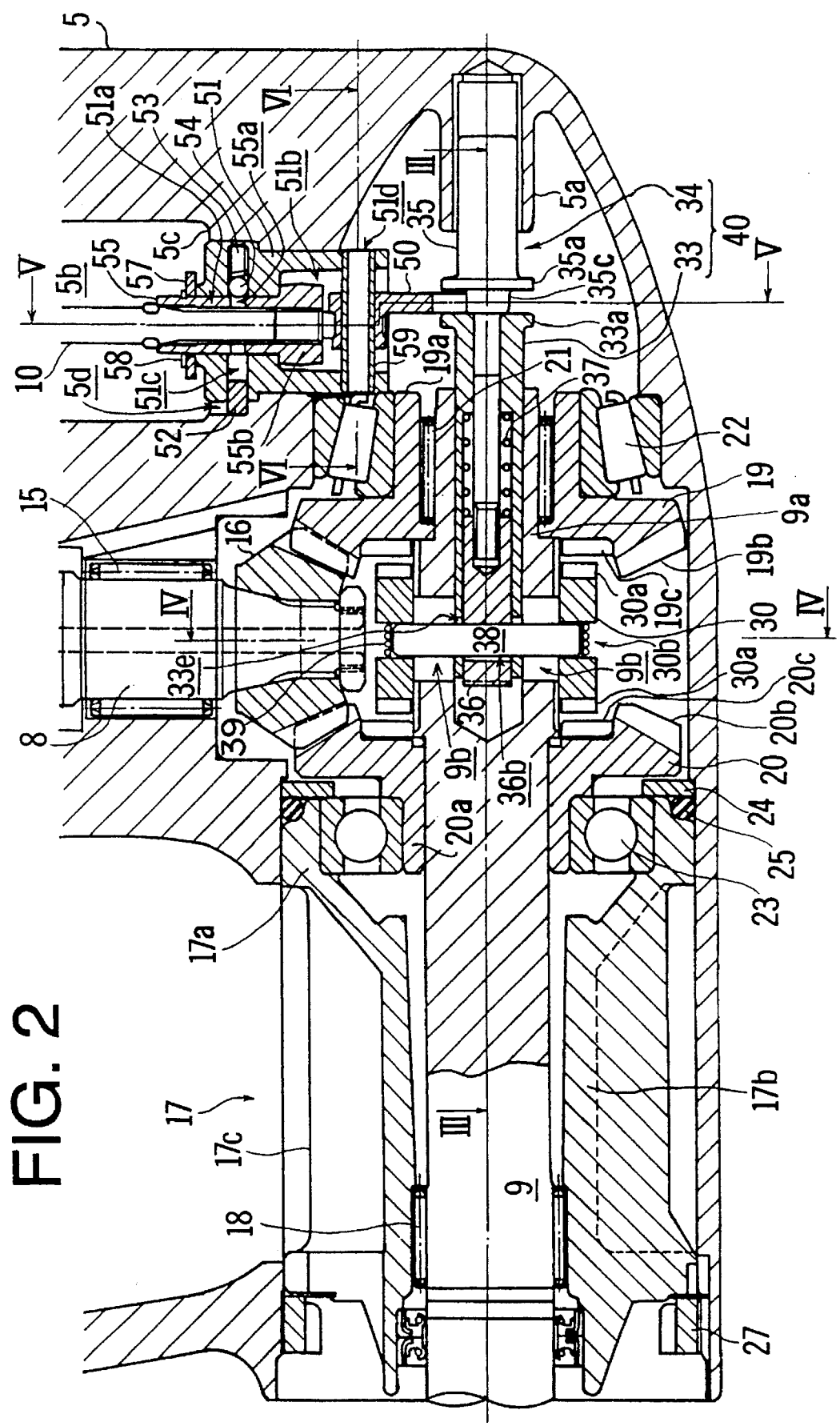
FIG. 2 is a side sectional view of a major portion of the same.
Figure 3:
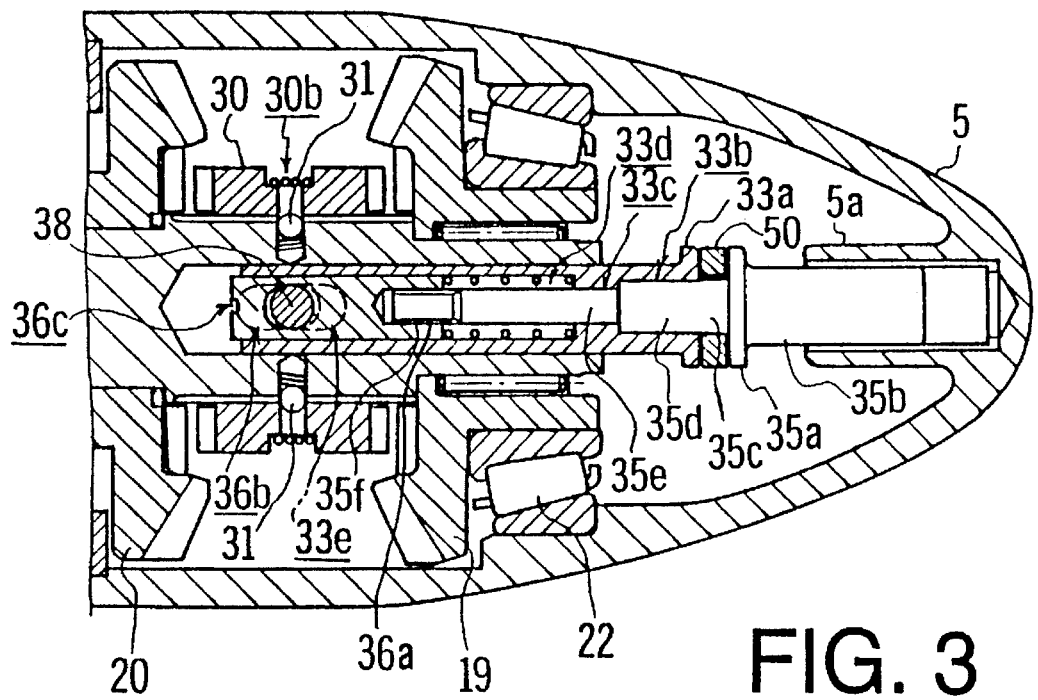
FIG. 3 is a sectional view taken along line III—III in FIG. 2.

In FIG. 2, a drive gear 16 is fitted on the lower end of the vertical shaft 8 which is rotatably supported by a bearing 15 in the gear case 5. On the other hand a pair of normally and reversely driven gears 19 and 20 are rotatably mounted in front of and behind the drive gear 16, on the propeller shaft 9 which is rotatably supported through a bearing 18 by a bearing holder or a support member 17 inserted from behind the gear case 5, and are in mesh with the drive gear 16.

The drive gear 16 and the driven gears 19 and 20 are bevel gears. The rotation of the drive gear 16 which is driven by the vertical shaft 8 is changed to the rotation of the driven gears 19 and 20 around axis of the propeller shaft 9 which is mounted nearly horizontally.

The front driven gear 19 rotates in a normal direction, while the rear driven gear 20 rotates in a reverse direction.

The driven gear 19 has a cylindrical portion 19a supported on the propeller shaft 9 through a bearing 21 from inside and supported in the gear case 5 through a bearing 22 from outside. The driven gear 19 is provided with clutch teeth 19c on radial inside of teeth 19b to be meshed with the drive gear 16.

The rear driven gear 20 is rotatably supported at a cylindrical portion 20a on the propeller shaft 9, and the cylindrical portion is also supported in the support member 17 by means of a bearing 23. Inside of teeth 20b in mesh with the drive gear 16, clutch teeth 20c are formed oppositely to the clutch teeth 19c of the driven gear 19.

The support member 17 supporting the propeller shaft 9 has a large-diameter cylindrical portion 17a at front inside of which the bearing 23 is mounted, and the small-diameter cylindrical portion 17a ranging from the center to the rear portion, through the inside of which the propeller shaft 9 is supported. On the outside of the cylindrical portion 17b are formed radial ribs or walls 17c between which exhaust gas passages are formed. The outer peripheral surface of the support member 17 is fitted in a specific position of the gear case 5.

The open end of the cylindrical portion 17a of the support member 17 is in contact with a washer 24 which fits in a groove on the gear case 5 side, and an O-ring 25 is interposed between the gear case 5 and the open end of the support member 17 for sealing.

The rear end portion of the support member 17 is locked and supported by a circular nut 27 which is screwed in the opening of the gear case 5.

On the propeller shaft 9 thus rotatably supported by the support member 17 which is fitted in the gear case 5, is splined a clutch gear 30 between the front driven gear 19 and the rear driven gear 20. The clutch gear is forwardly and backwardly slidable along the propeller shaft 9 and rotates in one unit with the propeller shaft 9.

The clutch pear 30 has clutch teeth 30a facing the clutch teeth 19c and 20c of the front and rear driven gears 19 and 20. When the clutch gear 30 slides forward, the clutch teeth 30a meshes with the clutch teeth 19c of the front driven gear 19 to rotate normally together with the driven gear 19, and when the clutch gear 30 slides backward, the clutch teeth 30a meshes with the clutch teeth 20c of the rear driven gear 20 to rotate reversely together with the driven gear 20.

The rotation of the clutch gear 30 is transmitted to the propeller shaft 9 which is splined thereto, and therefore the propeller shaft 9 normally rotates with the forward movement of the clutch gear 30, and reversely rotates with the backward movement of the clutch gear 30. When the clutch gear 30 is positioned at center where the teeth 30a is not engaged with either of the front and rear driven gears 19 and 20, no rotation is transmitted, that is, the clutch gear 30 is in neutral state.

Figure 4:
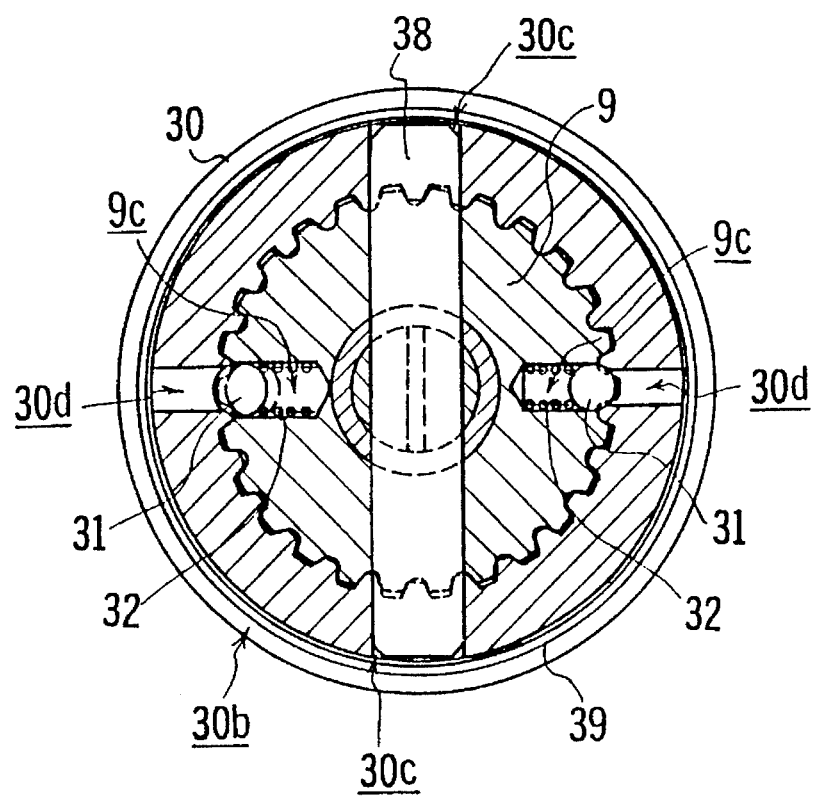
FIG. 4 is a sectional view taken along line IV—IV in FIG. 2.
Figure 5:
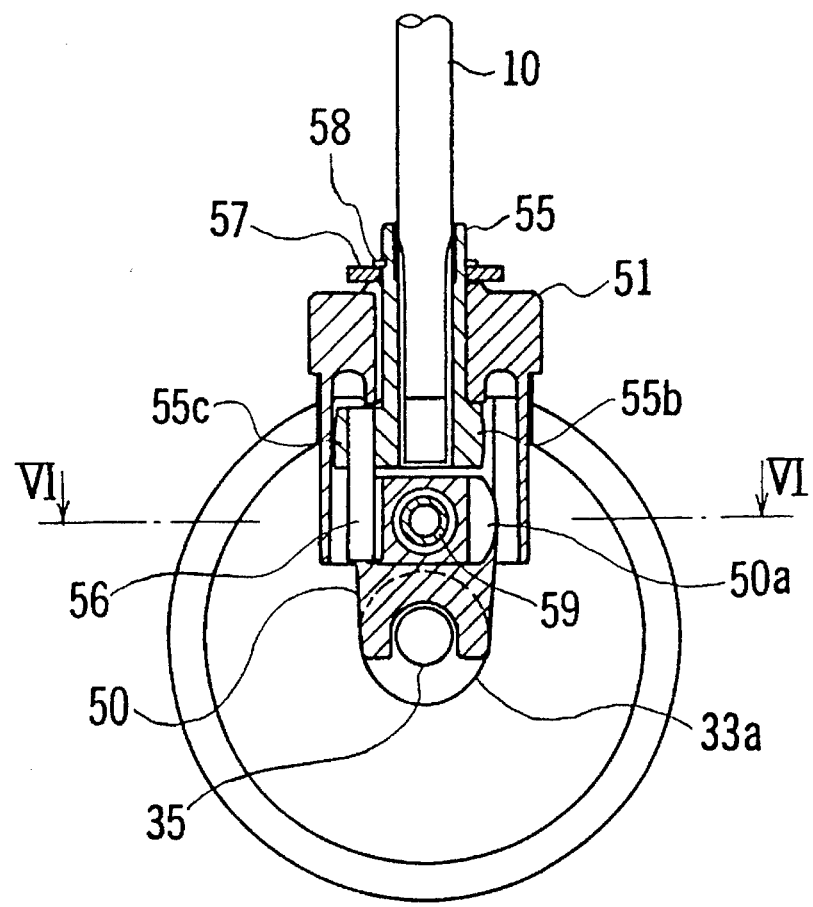
FIG. 5 is a sectional view taken along line V—V in FIG. 2.

The clutch gear 30 is provided with a groove 30b formed circumferentially in the middle of a axial direction; and, as shown in FIG. 4, there are provided diametrically opposing large-diameter round holes 30c and diametrically opposing small-diameter round holes 30d drilled so as to open on the groove 30b. The holes 30c and 30d are arranged at right angle to each other.

In the large-diameter round holes 30c a clutch shifter pin 38 described later is inserted, while in each of the small-diameter round holes 30d a slightly larger-diameter set ball 31 is seated, partly sunk, on the inside opening.

In the positions of the propeller shaft 9 corresponding to the round holes 30d are formed a round holes 9c, where the set balls 31 can move in and out, and springs 32 are installed inside to thereby press the set balls 31 outwardly.

The set balls 31 pressed outwardly by means of the springs 32 are engaged in the round holes 30d of the clutch gear 30 to thereby lock the clutch gear 30 in a neutral position.

Thus, the clutch gear 30 is designed to be positioned in the neutral position by the set ball 31. When the clutch gear 30 is given a forward or backward force and the force overcomes a force of the spring 32, the set ball 31 retreats into the hole 9c to release the clutch gear 30, which is thus allowed to move (see FIGS. 7 and 8).

On the ether hand, the propeller shaft 9 is provided with an axial round hole which extends from the front end of the shaft 9 to the position correspondent to the rear driven gear 20. Namely, the front part of the propeller shaft 9 is formed as the cylindrical portion 9a. And on the position of the cylindrical portion 9a corresponding to the clutch gear 30 is drilled an axially long hole 9b perpendicularly to the axis of the propeller shaft 9.

In the cylindrical portion 9a, a shift slider 40 which is a double-cylinder assembly of an outer shift slider 33 and an inner shift slider 34 is slidably inserted from front.

The outer shift slider 33 is formed in a substantially cylindrical form and has a flange 33a at the front end. The inner hole of the outer slider 33 is formed by an oblong hole 33b of an oblong or elliptical section at the front, a small round hole 33c formed for a short distance in the following portion, and a large-diameter round hole 33d extending to the rear end.

In the rear portion of the outer shift slider 33 in which the large-diameter round hole 33d formed, a long hole 33e which is a little larger in diameter in an axial direction is formed in a direction rectangular to the axis.

The inner shift slider 34 comprises a front member 35 and a rear member 36 which are connected by screws with each other. The front member 35 has a flange 35a on a portion a little to the front. Before the flange 35a is formed a large-diameter cylindrical portion 35b. A short cylindrical portion 35c which is a little smaller in diameter than the cylindrical portion 35b is formed behind the flange 35a. Immediately after the short cylindrical portion 35c is formed a flat portion 35d which fits in the oblong hole 33b of the outer shift slider 33. Further to the rear of the flat portion 35d is formed a small-diameter cylindrical portion 35e which fits in the small round hole 33c of the outer Shift slider 33, and on the rear end portion of the cylindrical portion 35e is formed an external screw 35f.

The rear member 36 is cylindrical and slidably fitted in the large-diameter round hole 33d which is open towards the rear of the outer shift slider 33. On the front portion of the rear member 36 is formed an internal screw 36a which is meshed with the external screw 35f of the front member 35, and through the rear portion of the rear member 36 is formed a long hole 36b of a little larger diameter in the axial direction, perpendiculary to the axial direction. And on the rear end face is formed a slot 36c for a screw driver.

The front member 35 and the rear member 36 stated above are connected into a one-body inner shift slider 34 by engagement of the external screw 35f and the internal screw 36a.

The inner shift slider 34 and the outer shift slider 33 are sub-assembled in advance and a spring 37 is interposed therebetween.

That is, first the front member 35 of the inner shift slider 34 is inserted into the front opening of the outer shift slider 33, and the flat portion 35d on the front member 35 side is fitted in the oblong hole 33b on the outer shift slider 33 side, thereby restricting relative rotation of both of these members. Between the flanges 33a and 35a of these members is provided a space of the same length as that of the cylindrical portion 35c of the front member 35.

Into the large-diameter round hole 33d of the outer shift slider 33, he small-diameter cylindrical portion 35e of the front member 35 is projecting from the front. Between the round hole 33d and the cylindrical portion 35e is inserted a coil spring 37; the rear member 36 of the inner shift slider 34 is fitted in the hole 33d so as to close the rear opening of the outer shift slider 33; and with the front internal screw 36a aligned with the external screw 35f of the front member 35, the rear member 36 is turned by a screw driver using the slot 36c provided in the rear end face to engage the front internal screw 36a with the external screw 35f. Thereby the spring 37 is compressed between the rear member 36 and,the outer shift slider 33 to push the outer shift slider. 33 forwardly and the inner shift slider 34 backwardly.

The rotation of the rear member 36 is adjusted so that the long hole 33e of the outer shift slider 33 and the long hole 36b of the rear member 36 will be a little out of alignment in a longitudinal direction.

That is, adjustment is made to locate the long hole 36b of the rear member 36 a little behind the long hole 33e of the outer shift slider 33 so that the aligned parts of these long holes will just form a round hole.

The outer shift slider 33 and the inner shift slider 34 which have been sub-assembled as described above are inserted into the cylindrical portion 9a through the front opening of the propeller shaft 9. The round hole formed by the aligned parts of the long holes 33e and 34b is aligned with the long hole 9b of the propeller shaft 9 and the round hole 30c of the clutch gear-30, and the clutch Shifter pin 38 is inserted into the holes thus aligned.

The clutch shifter pin 38 has a length equal to the inside diameter of the groove 30b provided circumferentially on the clutch gear 30, and a coil 39 is fitted in the groove 30b to prevent the clutch shifter pin 38 from dropping.

The clutch shifter pin 38 is integrally fitted in the round hole 30c of the clutch gear 30, through the long hole 9b of the propeller shaft 9, so as to be longitudinally slidable together with the clutch gear 30.

In the neutral state, the clutch Shifter pin 38 is inserted through the outer shift slider 33 along the rear edge of the long hole 33e leaving a space to the front edge of the long hole 33e, and through the inner shift slider 34 along the front edge of the long hole 36b leaving a space to the rear edge of the long hole 33e.

Since the long hole 36b of the inner shift slider 34 has a spacing at the rear of the clutch shifter pin 38, when the inner shift slider 34 receives a forward force, the force will not be exerted directly to the clutch shifter pin 38 but will compress the spring 37, thereby transmitting the force by virtue of a spring force of the spring 37 to the outer shift slider 33. Since the long hole 33e of the outer shift slider 33 is in contact with the clutch shifter pin 38 at the rear edge, the outer shift slider 33 acts to move the clutch shifter pin 38 forwardly.

That is, when the inner shift slider 34 receives a forward force, the force acts on the clutch shifter pin 38 through the spring 37 and the outer shift slider 33 for moving the clutch gear 30 integral with the clutch shifter pin 38 forwardly.

Reversely, the long hole 33e of the outer shift slider 33 has a spacing before the clutch shifter pin 38, and therefore when the outer shift slider 33 receives a backward force, the force will not act directly on the clutch shifter pin 38, but compresses the spring 37, thereby transmitting the force by virtue of a spring force of the spring 37 to the inner shift slider 34. Since the front edge of the long hole 36b of the inner shift slider 34 is in contact with the clutch shifter pin 38, the inner shift slider 34 acts to move the clutch shifter pin 38 backwardly.

That is, when the outer shift slider 33 receives a backward force, the force acts on the clutch shifter pin 38 through the spring 37 and the inner shift slider 34, thereby moving the clutch gear 30 integral with the clutch shifter pin 38 backwardly.

There is provided the so-called detent mechanism that the clutch gear 30, as described above, is positioned in a neutral state by means of the set ball 31 relative to the propeller shaft 9, and therefore when the spring force of the spring 37 acts on the clutch shifter pin 38 to overcome the force of the spring 32 which is protruding the set ball 31 out, the set ball 31 sinks to disconnect the clutch gear 30, whereby the clutch gear 30 is moved energetically in the axial direction into mesh with either one of the driven gears 19 and 20.

Clutch operation is done smoothly by means of the detent mechanism.

Figure 7:
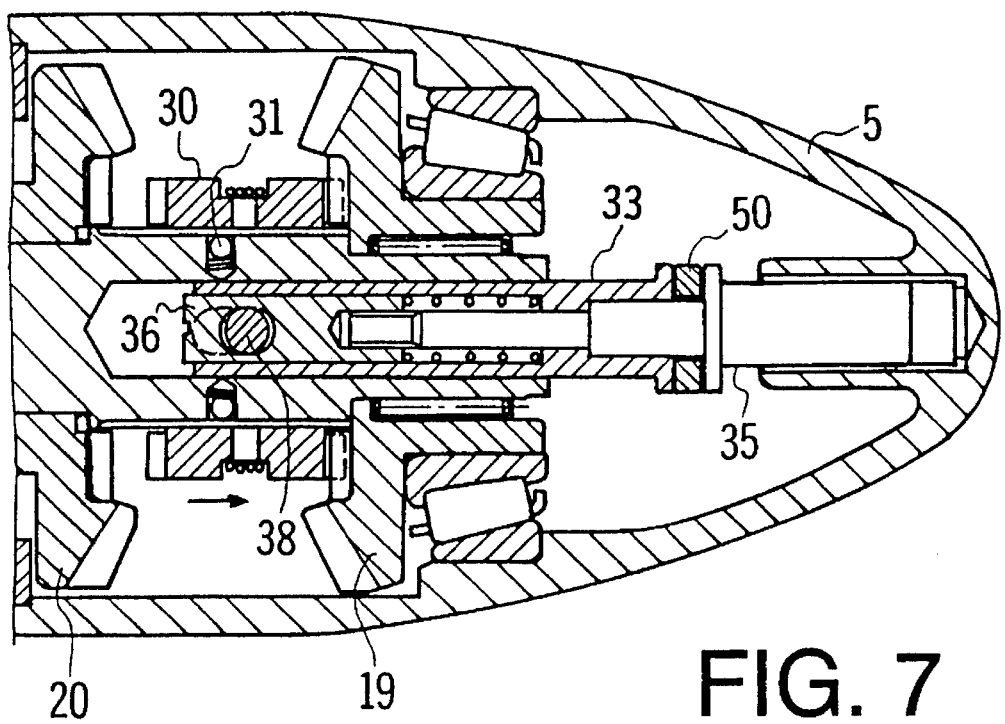
FIG. 7 is a transverse sectional view showing a clutch engaged in ahead position.
Figure 8:
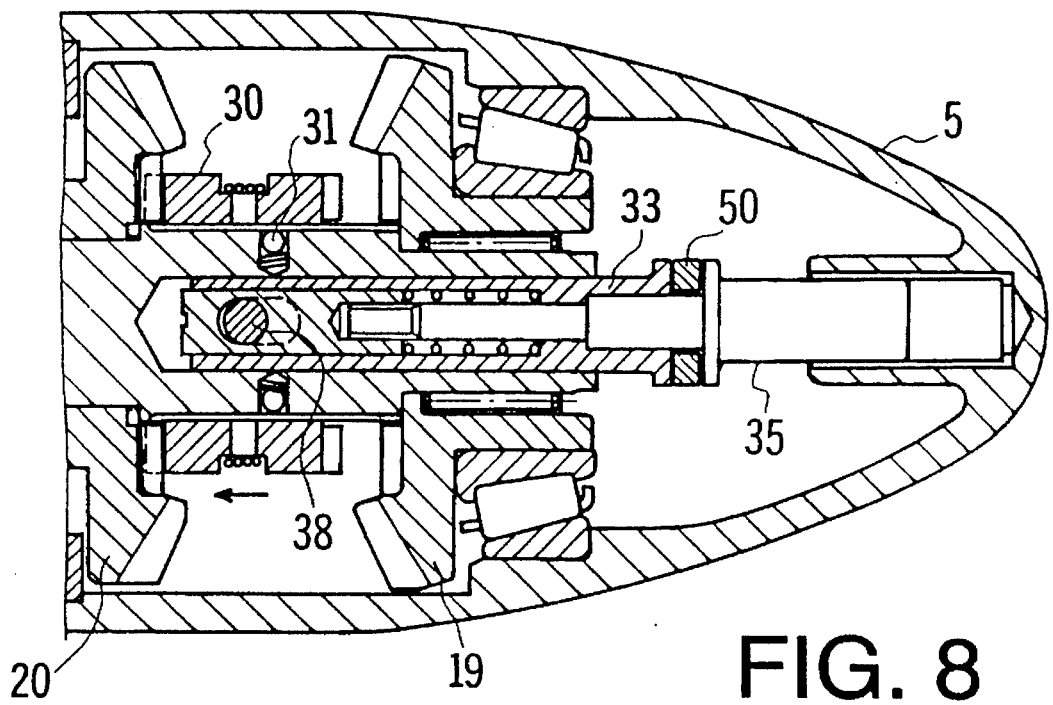
FIG. 8 is a transverse sectional view showing the clutch engaged in astern position.

FIG. 7 is a view showing the clutch gear 30 meshing with the front driven gear 19 in the ahead state of the boat S, and FIG. 8 is a view showing the clutch gear 30 meshing with the rear driven gear 20 in the astern state of the boat S.

Next, an operating mechanism for moving the outer shift slider 33 or the inner shift slider 34 will be explained.

The front cylindrical portion 35b of the front member 35 of the inner shift slider 34 is slidably fitted in the cylindrical portion 5a formed on the gear case 5. Between the cylindrical portion 5a and the propeller shaft 9 are positioned the flange 35a of the inner shift slider 34 and the flange 33a of the outer shift slider 33 with a specific size of distance provided therebetween. A bifurcated shift fork 50 is mounted astride the cylindrical portion 35c from above between the flanges 35a and 33a.

Above the shift fork 50, a substantially cylindrical housing or a support member 51 is fitted and supported in the opening 5c which is provided at the lower end of the round hole 5b formed in the gear case 5 and a little smaller in diameter than the round hole 5b.

The support member 51 has a small-diameter round hole 51a in the upper half portion and a large-diameter round hole 51b in the lower half portion, both formed through in a vertical direction. There are formed a small-diameter lateral hole 51c in the upper half portion and a lateral hole 51d in the vicinity of the lower end of the lower half portion. The holes 51c and 51d are formed in parallel with the propeller shaft 9.

In one side of the upper lateral hole 51c is fitted a knock pin 52 for positioning the support member 51, partly protruding outside. The knock pin 52 is inserted from above into a groove 5d which is formed at the rear portion of the opening 5c to position the support member 51.

Another side of the upper lateral hole 51c is made small in diameter in the vicinity of the outside surface. And a spring 3 and a retaining ball 54 are inserted from inside in the lateral hole 51c.

In the round hole 51a of the support member 51 is rotatably inserted a cylindrical eccentric pin holder 55.

In the cylindrical portion of the eccentric pin holder 55 is fitted the shift rod 10, and the eccentric pin holder 55 is rotatable together with the shift rod 10. A lateral hole 55a is formed on the side surface of the pin holder 55 at a specific position, and the retaining ball 54 engages with the hole 55*a* to positioning the pin holder 55 in the neutral state.

The eccentric pin holder 55 large in outside diameter at the lower end 55*b* has a dilated portion 55*c* bulging rightwards in the neutral position (FIG. 5) and a bar-like eccentric pin 56 is fitted in the dilated portion 55*c* and extends downwardly.

The eccentric pin holder 55 is fitted in the round hole 51*a* of the support member 51 from under, and is retained at an upwardly exposed portion thereof by a retaining piece 58 through a washer 57, thereby being rotatably supported by the support member 51.

On the other hand, a shift fork guide pin 59 is provided in the lower lateral hole 51*c* of the support member 51 in parallel with the propeller shaft 9. The upper portion of the shift fork 50 is installed through the shift fork guide pin 59, thus being longitudinally slidably supported.

Figure 6:
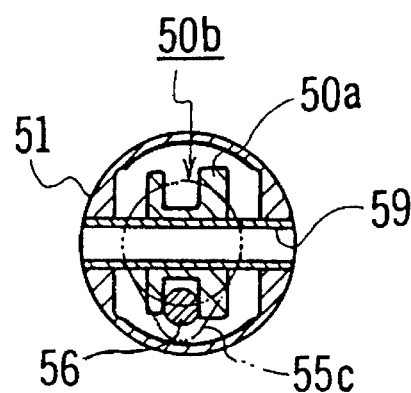
FIG. 6 is a sectional view taken along line VI—VI in FIG. 5.

The sliding portion 50*a* of this shift fork 50 has grooves 50*b* on the opposite sides. The eccentric pin 56 is engaged with the right side groove 50*b* (FIG. 6).

The clutch operating mechanism is of the aforesaid construction, and in the neutral condition the eccentric pin 56 is in the rightmost position. When the shift rod 10 is turned counterclockwise as viewed from above, the eccentric pin 56 also turns counterclockwise with the eccentric pin holder 55 to slide the shift fork 50 forwardly.

The shift fork 50, when slid forwardly, moves the inner shift slider 34 forwardly, and therefore, as described above, the clutch gear 30 operates like a detent to engage the front driven gear 19 as shown in FIG. 7, transmitting the normal rotation to the propeller shaft 9 to move the boat S ahead.

Reversely, when the shift rod 10 is turned clockwise as viewed from above, the eccentric pin 56 turns clockwise to slide the shift fork 50 backwardly. Accordingly the shift fork 50 moves the outer shift slider 33 backwardly, and the clutch gear 30 operates like a detent to engage the rear driven gear 20 as shown in FIG. 8, transmitting the reverse rotation to the propeller shaft 9 to turn the propeller 7 reversely to thereby move the boat S astern.

With the clutch gear 30 splined to the propeller shaft 9, the clutch gear 30 is positioned in neutral by means of the set ball 31, and then the above-described sub-assembly of the outer shift slider 33 and the inner shift slider 34 is inserted from the front into the cylindrical portion 9*a* of the propeller shaft 9. Subsequently, with the long holes 33*e* and 36*b* properly aligned with the long hole 9*b* of the propeller shaft 9 and the round hole 30*c* of the clutch gear 30, the clutch shifter pin 38 is inserted through and supported with the coil 39.

On the front end portion of the propeller shaft 9 on which the outer shift slider 33, the inner shift slider 34 and the clutch gear 30 are assembled, the front driven gear 19 is rotatably fitted through the bearing 21. The bearing 22 is interposed between the driven gear 19 and the gear case 5 and then the propeller shaft assembly is inserted into the gear case 5 at the rear opening, and then the front cylindrical portion 35*b* of the front member 35 of the inner shift slider 34 is inserted into the cylindrical portion 5*a*.

With the drive gear 16 in mesh with the driven gear 19, the vertical shaft 8 is inserted from above into the gear case 5 through the bearing 15 and further the drive gear 16 is fitted on the lower end portion.

Subsequently, the driven gear 20 is fitted on the propeller shaft 9 and meshed with the drive gear 16. The washer 24, bearing 23 and O-ring 25 are mounted in the gear case 5 and the support member 17 is inserted into the gear case 5 with the bearing 18 interposed between the support member 17 and the propeller shaft 9.

Then, the shift rod 10, the eccentric pin holder 55, the eccentric pin 56, the shift fork guide pin 59 and the shift fork 50, etc. that have been positioned by the retaining ball 54 in a neutral position and installed as a unit to the support member 51 are inserted from above into the round hole 5*b* in the gear case 5. At this time, when the knock pin 52 is inserted so that the knock pin 52 will be fitted in the groove 5*d*, the shift fork 50 engages such that the fork section or the bifurcated portion will ride astride the cylindrical portion 35*c* of the inner shift slider 34 between the flanges 33*a* and 35*a*.

It is, therefore, possible to easily install the drive transmission system as described above.

With the counterclockwise rotation of the shift rod 10, the clutch gear 30 makes a detent action forwardly to smoothly mesh the front driven gear 19 as shown in FIG. 7, thereby enabling normal rotation of the propeller shaft 9 to propel the boat ahead. Reversely, with the clockwise rotation of the shift rod 10, the clutch gear 30 makes a detent action backwardly to thus smoothly engage the rear driven gear 20 as shown in FIG. 8, enabling reverse rotation of the propeller shaft 9 to move the boat astern.

In some boats mounted with two outboard motors at stern, one of the motors is set to a base specification and the other to a counter specification so that directions of propeller blade arrangement will differ between the two motors that turn in opposite directions to thereby keep balanced propulsion.

When two outboard motors of the embodiment stated above are used as the base specification and the counter specification, these motors must be designed such that when the clutch gear 30 mounted in the outboard motor of base specification is moved forwardly into mesh with the front driven gear 19, the clutch gear of the outboard motor of counter specification will be moved backwardly into mesh with the rear driven gear in order to rotate the propeller 7 of base specification normally and the other propeller of counter specification reversely.

In the outboard motor of the present embodiment, therefore, the eccentric pin holder 55 can be mounted on the lower end of the shift rod 10 in the state that it is turned by 180 degrees about axis of the shift rod 10.

Figure 9:
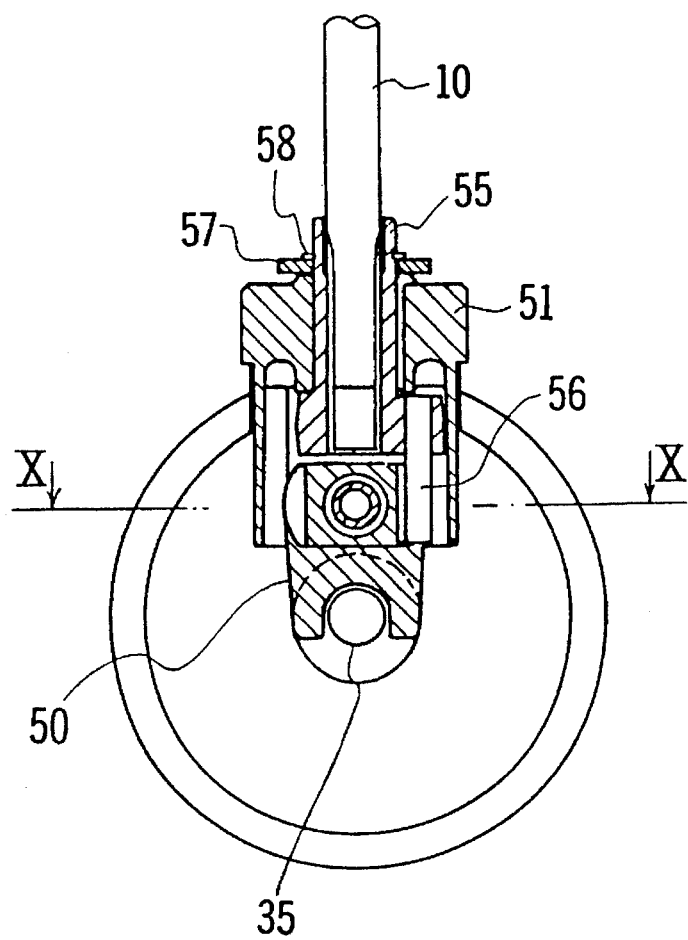
FIG. 9 is a sectional view of a clutch operating system of the outboard motor of the counter specification.
Figure 10:
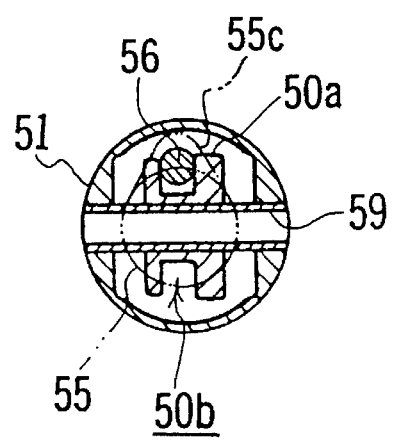
FIG. 10 is a sectional view taken along line X—X in FIG. 9.

That is, when the eccentric pin holder 55 is mounted on the shift rod 10 in a position turned 180 degrees, the eccentric pin 56 held by the eccentric pin holder 55 in neutral position is positioned on the left opposite to that of the base specification in relation to the central axis of rotation, engaging in the groove 50*b* on the left side of the shift fork 50 as shown in FIGS. 9 and 10.

Therefore with the counterclockwise rotation of the shift rod 10, the shift fork 50 in the motor of the base specification is moved forwardly, while the shift fork 50 in the motor of the counter specification is moved backwardly, thereby moving the clutch gear into mesh with the rear driven gear through the shift sliders 33 and 34 to enable reverse rotation of the propeller.

With the clockwise rotation of the shift rod 10, the shift fork 50 in the motor of the counter specification is moved forwardly to turn the propeller in the normal direction.

Figure 11:
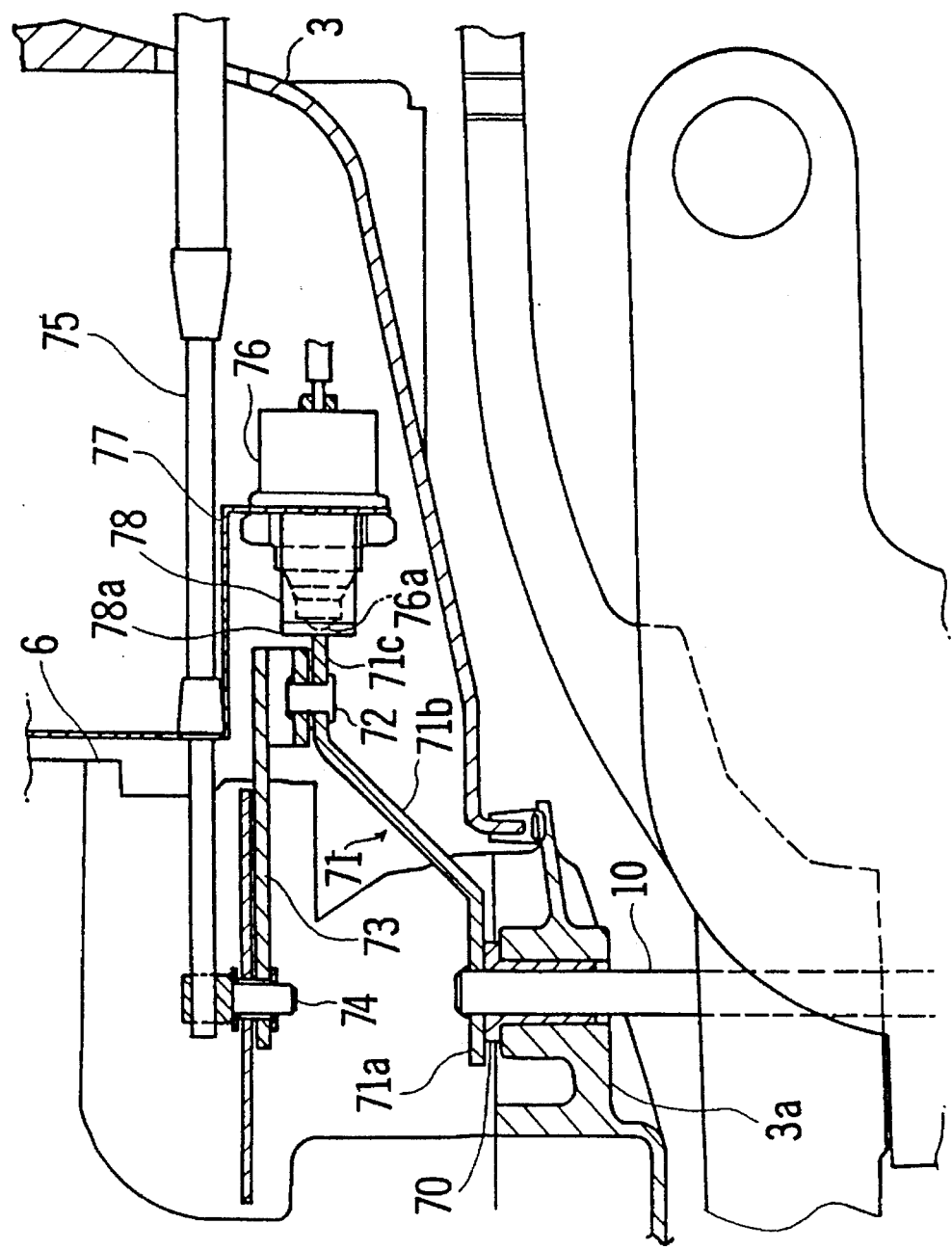
FIG. 11 is a side sectional view of an upper portion of the outboard motor.

It is possible to constitute the outboard motor of the counter specification simply by using the same members except the propeller as described above The shift rod 10 is arranged in front of and in parallel with the vertical shaft 8. As shown in FIG. 11, the upper end portion of the shift rod 10 passes through a bottom wall 3a of the engine cover 3 and supported by a bearing member 70, and a base end portion 71a of a shift arm 71 is fixedly fitted to the portion of the shift rod 10 extending upwardly from the bearing member 70.

Figure 12:
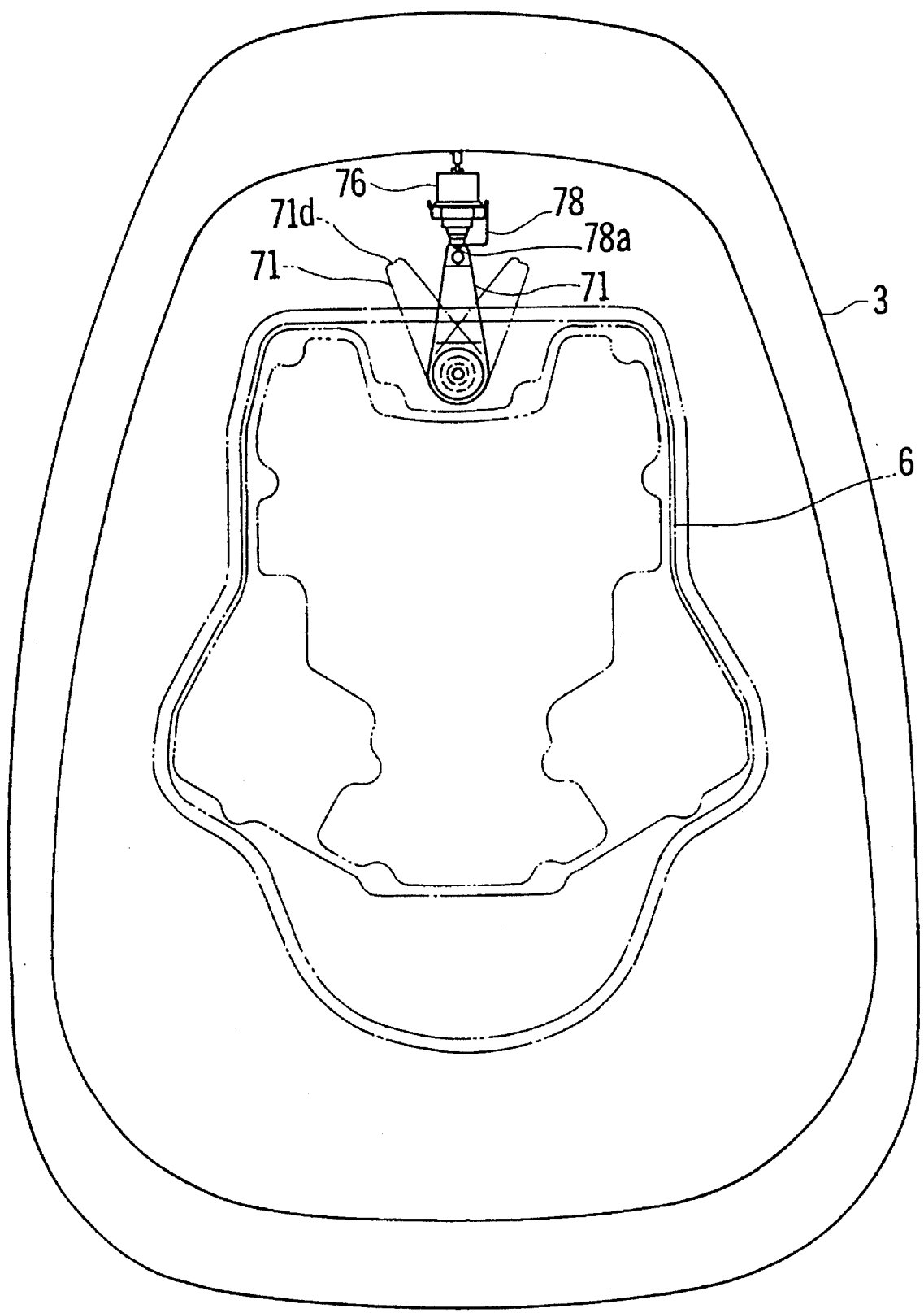
FIG. 12 is a plan view of an essential part of the upper portion.

The shift arm is a tapering flat plate having a slant portion 71b obliquely upwardly bent from the base end portion and a horizontal tip end portion 71c. As slight dent 71d is formed on the end edge of the tip end portion 71c (FIG. 12).

A front end of a connecting member 73 is fixed to the tip end portion 71c by a rivet 72 and the rear end portion of the connecting member 73 is fitted to a rotary shaft 74 which is pivotally supported above the shift rod 10 coaxially with it. To the rotary shaft 74 is fixed a base end portion of a shift handling lever 75. The shift handling lever 75 extends forwardly and extrudes out of the engine cover 3.

Therefore, by rotating the shift handling lever 75 about the axis of the rotary shaft 74 and the shift rod 10, the shift rod 10 can be rotated through the rotary shaft 74, connecting member 73 and shift arm 71.

In front of the shift arm 71, a neutral switch 76 is supported by a bracket 77. The neutral switch 76 is a limit switch provided with a ball 76a as moving member projecting rearwardly. The ball 76a enters into the switch 76 to close an electric contact when pushed by an outer force and automatically returns to open the electric contact when the outer force is taken off.

An elastic plate 78 projects rearwardly from right side of the neutral switch 76. At the portion of the elastic plate 78 bent toward left inner side and contacted with the ball 76b is formed a projection 78a protruded rearward.

The base end portion 71a of the shift arm 71 is fixed to the shift rod 10 which has been assembled in its neutral position by means of the retaining ball 54 as above-mentioned, in the state that the dent 71d of the shift arm 71 is engaged with the projection 78a of the elastic plate 78.

In this state, the dent 71d of the shift arm 71 engaging with the projection 78a of the elastic plate 78 pushes the ball 76a of the neutral switch 76 through the elastic plate 78 to close the electric contact, so that the neutral state of the shift operating mechnism can be detected by the neutral switch 76.

At the same time, the shift arm 71 is positioned by an elastic force of the elastic plate 78 acting on the dent 71d through the projection 78a engaged with the dent. Therefore, the shift arm 71 and the shift rod 10 can be connected to each other in the accurate positional relation. However, the engagement of the dent 71d and the projection 78a can be easily released for allowing the shift rod 10 to rotate by manipulating the shift handling lever 75 toward right or left.

In the state that the shift arm 71 is positioned at the above-memtioned neutral position, the front end of the connecting member 73 having the rear end portion fitted to the rotary shaft 74 is fitted up to the front end portion of the shift arm 71, and the shift handling lever 75 is fixed to the rotary shaft 75 for taking its neutral position.

Thus, the whole shift operating mechanism is assembled in the neutral state.

Figure 13:
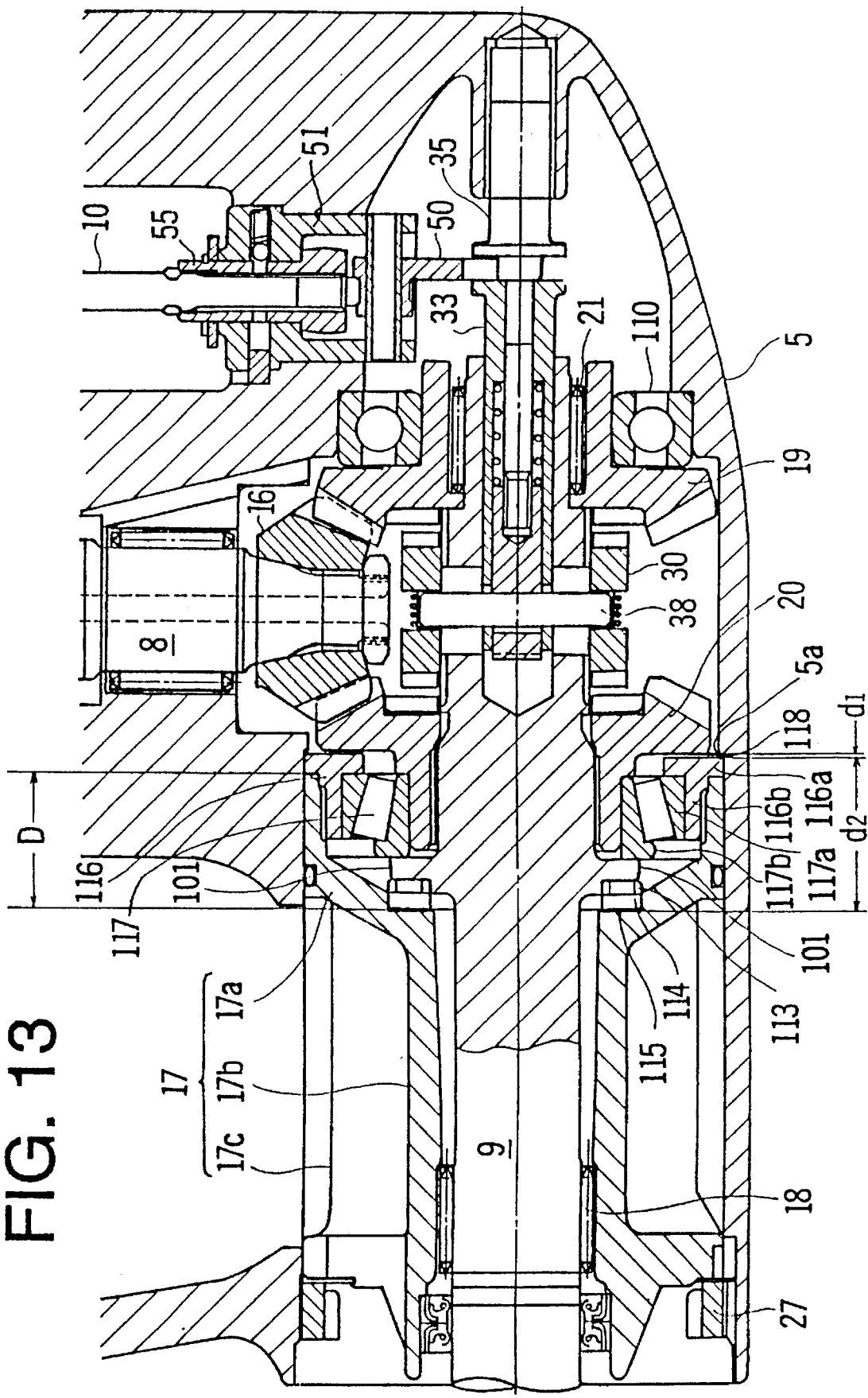
FIG. 13 is a view similar to FIG. 2 showing another embodiment according to the present invention.

FIG. 13 is a view similar to the aforementioned FIG. 2 showing another embodiment of the present invention. In FIG. 13, parts similar to those in FIG. 2 are denoted by the same reference numeral and detailed explanations regarding these parts will be omitted hereinafter.

FIG. 13 is different from FIG. 2 in that the bearing 22 shown as taper roller bearing in FIG. 2 is replaced by a bail bearing 110 and the bearing 23 shown as bail bearing is replaced by a taper roller bearing 117.

A flange 101 is projectingly formed on the propeller shaft 9 and between the flange 101 and a thrust receiving surface at the front end of the cylindrical portion 17a of the shaft holder 17 are pinched a thrust bearing 113 and a washer 114 being adjusted by a shim 115.

The driven gear 20 is rotatably fitted on the propeller shaft in front of the flange 101, and between the driven gear 20 and the large-diameter cylindrical portion 17a of the shaft holder 17 are interposed the taper roller bearing 117 together with a bearing holder 116 which is fitted around the bearing 117 so as to hold it.

Figure 14:
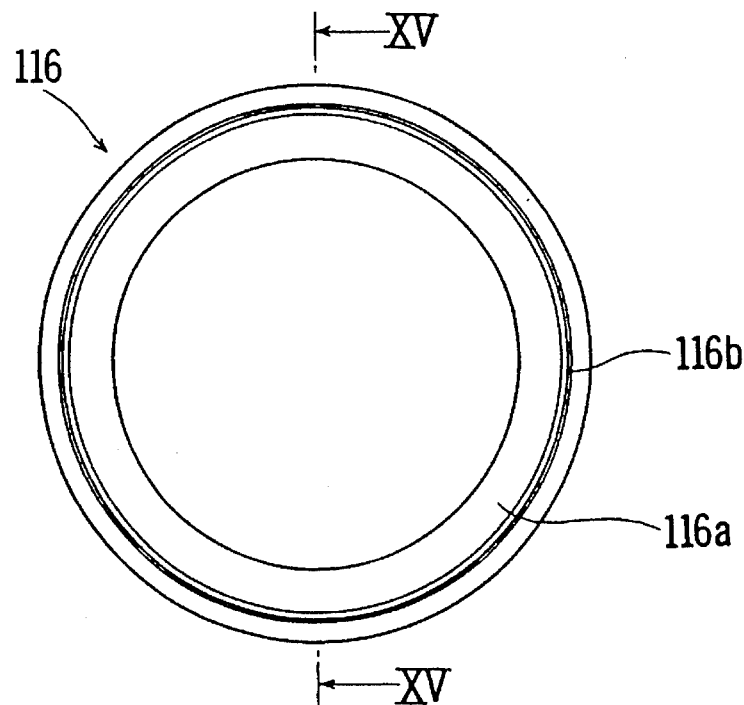
FIG. 14 is a rear view of a bearing holder in FIG. 13.
Figure 15:
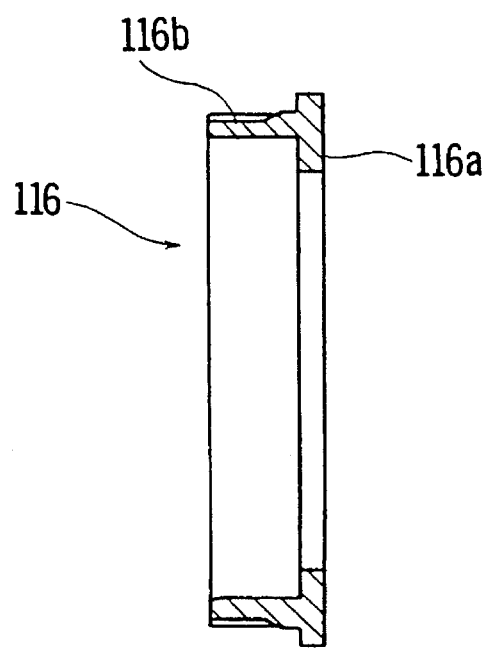
FIG. 15 is a sectional view taken along line XV—XV in FIG. 14.
Figure 16:
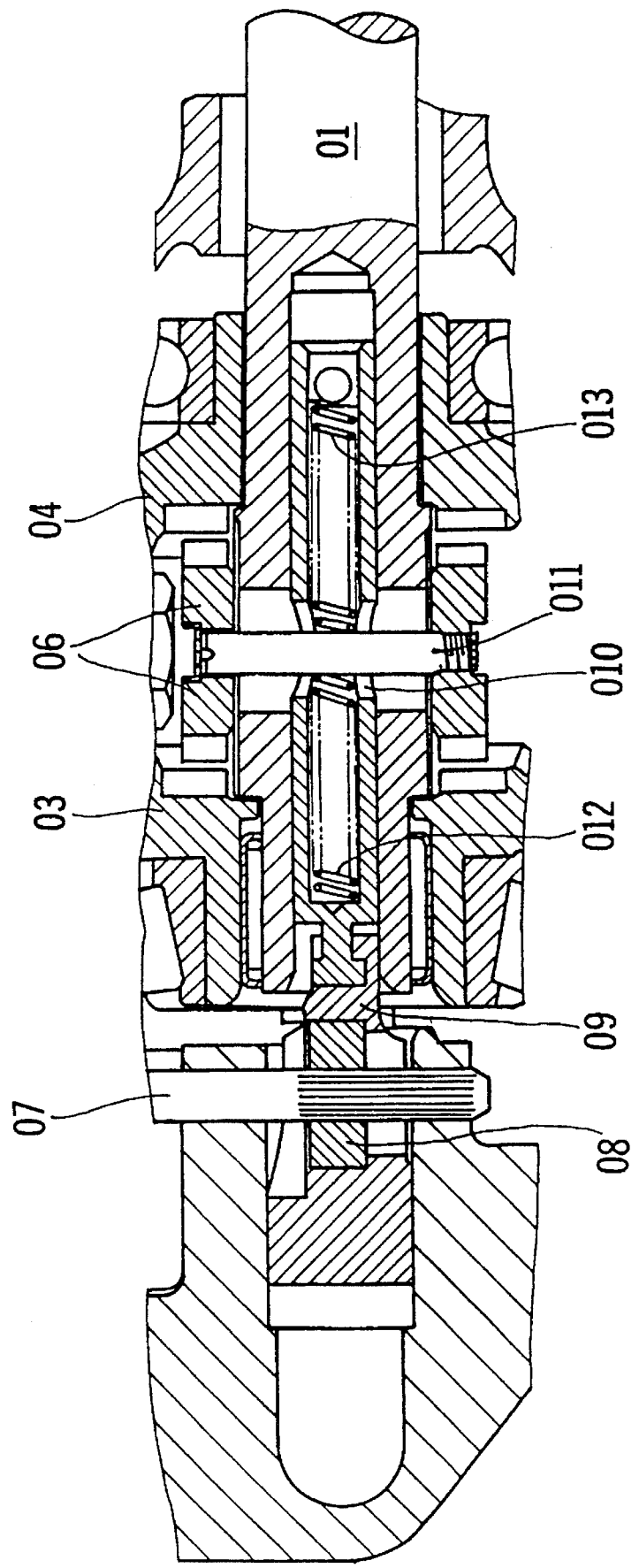
FIG. 16 is a side sectional view of a major portion of a customary outboard motor.

As shown in FIGS. 14 and 15, the bearing holder 116 has an annular plate portion 116a and a cylindrical portion 116b extending rearward from the rear surface of the annular plate portion 116a. That is, the bearing holder 116 has a T-shaped section. The taper roller bearing 117 is inserted into the cylindrical portion 116b from the rear, with the outer periphery of the outer race 117b held by the cylindrical portion 116b and the front end surface of the outer race 117a abutted against the annular plate portion 116a.

On the inner periphery of the inner race 117b of the taper roller bearing 117 held by the bearing holder 116 in such a manner as described above, the cylindrical portion of the driven gear 20 is fitted. The cylindrical portion 116b of the bearing holder 116 is fitted in the large-diameter cylindrical portion 17a of the shaft holder 17. The rear surface of the annular plate portion 116b of the bearing holder 116 is abutted against the front end surface of the portion 17a, and the outer peripheral edge of the front surface of the annular plate portion 116b is abutted against a shoulder portion 5a formed on inner periphery of the gear case 5 putting a shim 118 between them.

When forward thrust force is acting on the propeller shaft 9, the flange 101 is abutted against the rear side surface of the inner race 117b and the thrust force is transmitted to the gear case 5 through the flange 101, inner race 117b, outer race 117a, bearing holder 116 and shoulder portion 5a to propel the gear case 5 forward.

On the other hand, rearward thrust force acting on the propeller shaft 9 is transmitted to the shaft holder 17 through the flange 101, thrust bearing 113 and washer 114, and then from the shaft holder 17 to the gear case 5 through the nut 27 fitted in the rear opening of the gear case 5 to propel the gear case 5 rearward.

Since the drive gear and the driven gear are bevel gears mesging with each other, bearing portion of the driven gear 20 is required high rigidity in order to avoid influences of tooth hitting and the like. But, heretofore, it was difficult insure the high rigidity of the bearing portion from viewpoint of lightening the outboard motor.

According to the present embodiment, the front side surface and outer peripheral surface of the outer race 117a of the taper roller bearing 117 are held by the annular plate portion 116a and cylindrical portion 116b of the bearing holder 116 having the T-shaped section so that a compact and rigid construction of the bearing portion can be obtained.

On setting the shim 118, the distance $d_1$ between the rear side surface of the driven gear 20 and the front side surface of the bearing holder 116 is to be measured. On setting the shim 115, the distance D between the front end surface of the cylindrical portion 17b of the shaft holder 17 and the front end surface of the large-diameter portion 17a, and the distance $d_2$ between the front side surface of the bearing holder 116 and the rear side surface of the washer 114 in the assembled state are to be measured.

The aforementioned distance D has been measured at the time when the shaft holder 17 was manufactured and marked on it. Accordingly, only two measurment, the distance $d_1$ and $d_2$, are required for adjusting by the shims 15, 18, thus the adjusting and assembling became easier.

What is claimed is:

1. A drive transmission system for a vessel propelling equipment in which a propeller shaft having a propeller on one end is rotatably supported within a gear case; a pair of gears including an ahead gear and an astern gear which rotate in opposite directions are rotatably supported on said propeller shaft; and a clutch gear slidably supported on said propeller shaft and rotating together with said propeller shaft is clutch coupled to either one of said pair of gears, thereby turning said propeller normally or reversely to propel a vessel ahead or astern; said drive transmission system, comprising:

a shift slider axially slidable within said propeller shaft to move said clutch gear through a clutch shifter pin inserted through said propeller shaft; and an operating member capable of operating said shift slider from above said gear case;

said operating member including:

a shift fork engaged with a fork engaging portion of said shift slider for moving said shift slider;

a guide member supporting said shift fork and movable in a specific direction;

a rotatable rod member engaged with a rod engaging portion of said shift fork for moving said shift fork in response to rotation of said rotatable rod member; and a support member drivably supporting said rod member and fixedly supporting said guide member, thereby sub-assembling said rod member and said guide member for transmitting the operation of said rod member to said shift fork;

said support member being fitted in a fitting portion of said gear case from above.

2. A drive transmission system for a vessel propelling equipment in which a propeller shaft having a propeller on one end is rotatably supported within a gear case; a pair of gears including an ahead gear and an astern gear which rotate in opposite directions are rotatably supported on said propeller shaft; and a clutch gear slidably supported on said propeller shaft and rotating together with said propeller shaft is clutch coupled to either one of said pair of gears, thereby turning said propeller normally or reversely to propel a vessel ahead or astern; said drive transmission system, comprising:

a shift slider axially slidable within said propeller shaft to move said clutch gear through a clutch shifter pin inserted through said propeller shaft; and an operating member capable of operating said shift slider from above said gear case;

said operating member including:

a shift fork engaged with a fork engaging portion of said shift slider to move said shift slider;

a guide member supporting said shift fork movable in a specific direction;

a rotary rod member engaged with a rod engaging portion of said shift fork to move said shift fork; and a support member drivably supporting said rod member and fixedly supporting said guide member, thereby sub-assembling said rod member and said guide member to transmit the operation of said rod member to said shift fork;

said support member being fitted in a fitting portion of said gear case from above and having a positioning means for holding said shift fork in neutral position.

3. A drive transmission system for a vessel propelling equipment as claimed in claim 2, wherein positioning of said support member relative to said gear case is effected by fitting a projection provided on said support member in a slot formed vertically on the fitting portion of said gear case.

4. A drive transmission system for a vessel propelling equipment as claimed in claim 2, wherein said rod engaging portion of said shift fork can be engaged with said rod member turned to the opposite side by 180 degrees.

5. A drive transmission system for a vessel propelling equipment in which a propeller shaft having a propeller on one end is rotatably supported within a gear case; a pair of gears including an ahead gear and an astern gear which rotate in opposite directions are rotatably supported on said propeller shaft; and a clutch gear slidably supported on said propeller shaft and rotating together with said propeller shaft is clutch coupled to either one of said pair of gears, thereby turning said propeller normally or reversely to propel a vessel ahead or astern; said drive transmission system, comprising:

a shift rod rotatable about its axis for moving said clutch gear through a transmission mechanism for clutching motion;

a shift arm having a base end portion fitted on said shift rod so as to rotate integrally with said shift rod; and a neutral switch composed of a limit switch for detecting a neutral state;

said neutral switch positioning said shift arm at a neutral position of said shift arm by disengageably engaging with said shift arm to detain said shift arm.

6. A vessel propelling equipment having an engine with a vertical output shaft, a drive gear integrally connected to said output shaft, front and rear driven gears each engaged with said drive gear, and a clutch gear fitted on a propeller shaft by splines, said clutch gear sliding back and forth along said propeller shaft and engaging with either of said driven gears to rotate a propeller in a normal or reverse direction for forward or backward motion of the vessel, comprising:

a clutch shifter pin engaging with said clutch gear;

an outer shift slider axially slidably put within said propeller shaft and having an elongate hole which said clutch shifter pin penetrates through having some surplus spaces at before and behind;

an inner shift slider axially slidably put within said outer shift slider and having an elongate hole which said clutch shifter pin penetrates through having some surplus spaces at before and behind;

a spring interposed between said outer and inner shift sliders;

a shift fork moving back and forth to give a force and move either of said inner and outer shaft sliders according to the moving direction; and positioning means for positioning said clutch gear at a neutral position.

7. A vessel propelling equipment having an engine with a vertical output shaft, a drive gear integrally connected to said output shaft, front and rear driven gears each engaged with said drive gear, and a clutch gear fitted on a propeller shaft by splines, said clutch gear sliding back and forth along said propeller shaft and engaging with either of said driven gears to rotate a propeller in a normal or reverse direction for forward or backward motion of the vessel, comprising:

- a shaft holder provided in a casing of said vessel propelling equipment for supporting said propeller shaft rotatably;
- a bearing provided on a cylindrical portion of one of said driven gears extending along said propeller shaft;
- a circular ring-shaped bearing holder having a T-shaped section interposed between an outer periphery of said bearing and an inner periphery of said shaft holder, in a state that a front surface and outer peripheral surface of an outer race of said bearing are fittedly supported by said bearing holder; and
- a flange portion of said propeller shaft abutting against a rear side surface of an inner race of said bearing;
- said bearing holder having a front side surface abutting against a shoulder portion formed on an inner surface of said casing so that a thrust force of said propeller shaft is transmitted to said casing by means of said bearing and said bearing holder.

8. A drive transmission system for a vessel propelling system as claimed in claim 1, wherein positioning of said support member relative to said gear case is effected by fitting a projection provided on said support member in a slot formed vertically on the fitting portion of said gear case.

9. A drive transmission system for a vessel propelling equipment as claimed in claim 1, wherein said rod engaging portion of said shift fork can be engaged with said rod member turned to the opposite side by 180 degrees.

* * * * *